(12) United States Patent
Mahoney et al.

(10) Patent No.: US 7,998,593 B2
(45) Date of Patent: Aug. 16, 2011

(54) PROCESS FOR COATING SILVER INDIUM ALLOY METALLIC SEAL

(75) Inventors: Christopher D. Mahoney, Hamden, CT (US); James E. Beach, North Haven, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 1064 days.

(21) Appl. No.: 11/440,668

(22) Filed: May 25, 2006

(65) Prior Publication Data
US 2006/0269777 A1 Nov. 30, 2006

Related U.S. Application Data

(60) Provisional application No. 60/685,644, filed on May 27, 2005.

(51) Int. Cl.
- *C23C 30/00* (2006.01)
- *B05D 3/02* (2006.01)
- *C25D 5/10* (2006.01)
- *C25D 3/46* (2006.01)
- *C25D 3/48* (2006.01)

(52) U.S. Cl. ........ 428/615; 428/672; 428/673; 428/680; 427/383.1; 427/404; 427/405; 205/170; 205/266

(58) Field of Classification Search ............... 427/383.1, 427/404, 405; 428/457, 544, 610, 615, 655, 428/656, 668, 669, 672, 673, 680; 205/80, 205/170, 176, 247, 266

See application file for complete search history.

(56) References Cited

U.S. PATENT DOCUMENTS

| | | | | |
|---|---|---|---|---|
| 3,107,756 A | * | 10/1963 | Gallet | 428/552 |
| 3,515,950 A | * | 6/1970 | Koons et al. | 361/518 |
| 3,595,588 A | | 7/1971 | Rode | |
| 5,879,819 A | * | 3/1999 | Taguchi et al. | 428/673 |
| 6,322,087 B1 | | 11/2001 | Swensen et al. | |
| 6,968,615 B1 | | 11/2005 | More et al. | |
| 7,025,360 B2 | | 4/2006 | Walker et al. | |
| 2005/0145501 A1 | | 7/2005 | Bendik et al. | |

FOREIGN PATENT DOCUMENTS

GB 687259 * 2/1953

OTHER PUBLICATIONS

"Silver Plating Nickel Strike, High Bake," SAE International Aerospace Material Specification, Jan. 1994, 7 pages.
"Silver Plating for High Temperature Applications," SAE International Aerospace Material Specification, Apr. 1999, 8 pages.

* cited by examiner

*Primary Examiner* — William Phillip Fletcher, III
(74) *Attorney, Agent, or Firm* — Renner, Otto, Boisselle & Sklar, LLP

(57) ABSTRACT

A process for the manufacture of a metallic seal comprising applying a first intermediate layer to a base metal, applying a second intermediate layer overlying the first intermediate layer, applying a first coating layer comprising silver overlying the second intermediate layer, applying a second coating layer comprising indium overlying the first coating layer, baking the base metal with applied intermediate and coating layers at a temperature to diffuse the coating layers to form a silver indium alloy coating layer. A seal comprising a substrate having a metal surface, a first intermediate layer overlying the base metal, a second intermediate layer overlying the first intermediate layer, an alloy coating layer overlying the second intermediate layer, wherein the alloy coating layer comprises a silver indium alloy.

8 Claims, 2 Drawing Sheets

PROCESS FOR COATING SILVER INDIUM ALLOY METALLIC SEAL

RELATED APPLICATION

This application claims priority under 35 U.S.C. §119 (e) to U.S. Provisional Patent Application No. 60/685,644, filed on May 27, 2005. The entire disclosure of this provisional application is hereby incorporated by reference.

FIELD OF THE INVENTION

The invention relates to a process for manufacturing metal seals having high temperature and pressure resistance. The invention further relates to metal seals having a silver indium alloy coating for use in high temperature and high pressure environments.

BACKGROUND OF THE INVENTION

Various types of sealing devices exist for sealing opposing surfaces. Known seals include metallic sealing devices, which are commonly made of materials such as soft iron, carbon steel, stainless steel, high nickel alloy, Inconel or Nimonic alloys. To improve their sealing ability, the sealing surfaces of these known metallic seals can be coated with a deformable material, such as polytetrafluoroethylene (PTFE), gold, silver, copper, and the like.

Known metallic seals can be variously shaped, such as a metallic O-ring, and can have cross-sections of various shapes. For example, a "C" seal or spring-energized "C" seal is typically an annular seal having a "C"-shaped cross section. Known "E" seals are generally annular in configuration and have an "E" shaped cross-section. Other types of seals having cross sections which are parabolic, convoluted, Y-shaped, or omega-shaped (Ω-shaped) are also known. Some of these seals are designed to be more resilient than others, e.g., different seals are designed to achieve different sealing characteristics.

Although metallic seals of the type described generally function suitably in certain applications, these types of metallic seals have drawbacks. A coating is sometimes applied to these seals to enhance sealing characteristics, especially for use at high temperatures and pressures. For example, some metallic seals are often coated with a deformable material (e.g., PTFE, gold, silver, copper, and the like) in order to achieve the desired sealing integrity. Typically, seals for use in these applications are coated per AMS 2411 in which silver is deposited on a metallic seal with a gold strike between the base metal and the silver deposit to withstand temperatures of up to 1400° F. (760° C.). According to the AMS specification, small blisters of less than 0.015" on the deposit are acceptable.

SUMMARY OF THE INVENTION

The present invention provides a process which can minimize if not eliminate defects that could cause seal failure at high temperatures and pressures and which can also offer enhanced sealing characteristics. Moreover, the process can be implemented in a manner that reduces costs as compared to processes which require the use of gold.

In one embodiment, the invention is directed a process for coating of a metallic seal comprising applying a first intermediate layer to a base metal, applying a second intermediate layer overlying the first intermediate layer, applying a first coating layer comprising silver overlying the second intermediate layer, applying a second coating layer comprising indium overlying the second coating layer, baking the base metal with applied intermediate and coating layers at a temperature to diffuse first and second coating layers to form a silver indium alloy coating layer.

In another embodiment, the invention is directed to a metallic seal comprising a substrate having a metal surface, a first intermediate layer overlying the metal surface, a second intermediate layer overlying the first intermediate layer, an alloy coating layer overlying the second intermediate layer, wherein the alloy coating layer comprises a silver indium alloy.

DESCRIPTION OF THE INVENTION

The invention relates to metal seals having a silver-indium alloy coating layer and a process for providing the alloy coating layer on metal seals. The term "overlies" and cognate terms such as "overlying" and the like, when referring to the relationship of one or a first layer relative to another or a second layer, refers to the fact that the first layer partially or completely overlies the second layer. The term "underlies" and cognate terms such as "underlying" and the like have similar meanings except that the first layer partially or completely lies under, rather than over, the second layer.

Figure 1:
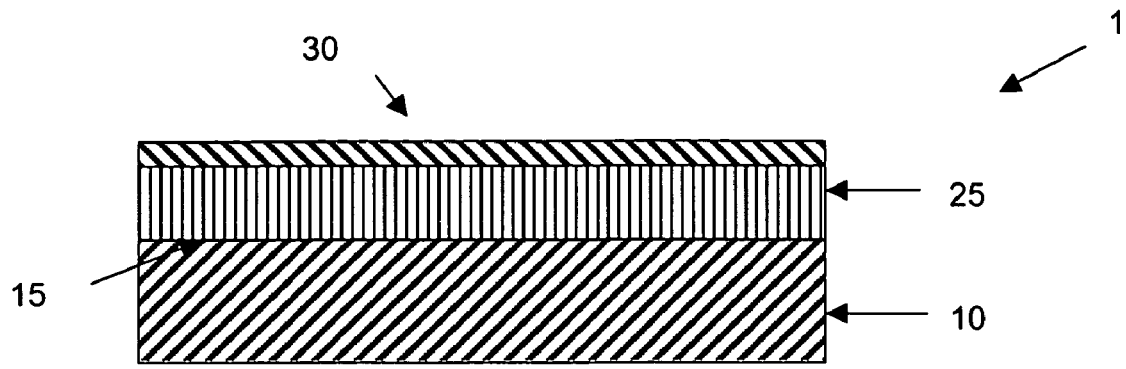
FIG. 1 is a schematic cross-sectional view of an embodiment of the invention prior to creation of the alloy layer in accordance with an embodiment of the invention.

Exemplary metal seals according to the invention are illustrated in the attached drawings. FIG. 1 is a schematic illustration of a partial side view of a seal 1 or sealing ring prior to creation of the alloy layer according to the invention. Seal 1 comprises a base metal 10 having a surface 15. Overlying base metal 10 is a first coating layer 25. A second coating layer 30 overlies first coating layer 25.

The silver-indium alloy coating layer is formed, in one embodiment, on a base metal 10. The base metal may comprise a "conventional" steel such as low carbon or low alloy steel that lacks corrosion resistance, or a corrosion resistant steel such as stainless steel or a nickel-based corrosion-resistant alloy, a cobalt-based alloy, copper, copper alloys, INCO, aluminum and/or aluminum alloys. The base metal 10 for the seal 1 may take various forms and may be C-shaped, E-shaped, parabolic, convoluted, Y-shaped, or omega-shaped (Ω-shaped) in cross section.

Prior to application of the first coating layer 25, base metal 10 may undergo pretreatment and/or cleaning to remove surface oxides and for enhanced adhesion of the coating layers 25, 30 to the base 10. This may be obtained by any of the treatments used to achieve a clean metal surface, including mechanical cleaning. The usual cleaning procedures of degreasing, either chemical or electrolytic, or other chemical cleaning operation may also be used to advantage. Such pretreatment can include, but is not limited to, intergranular etching of the substrate metal, sharp grit blasting of the metal surface, followed by surface treatment to remove embedded grit, or plasma spraying. In one embodiment, the base metal 10 will be pretreated by immersing in a cleaning solution and applying a current to the metal 10 to remove oxides and any foreign matter from metal surface 15. The metal 10 is then rinsed in water and chemically activated by immersion in an activating solution which further removes any oxides remaining on the metal surface 15. In one embodiment, activating solution is a hydrochloric acid solution.

Figure 3:
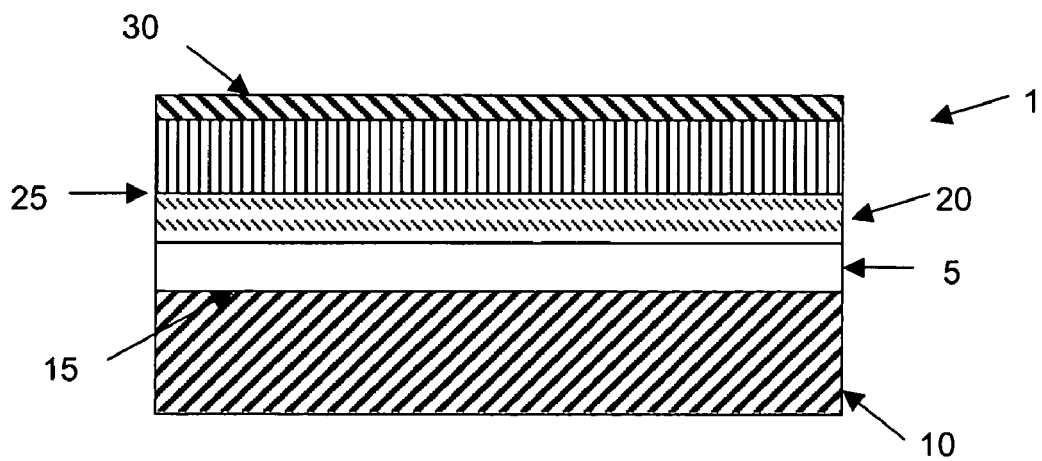
FIG. 3 is a schematic cross-sectional view of an embodiment of the invention including a nickel strike layer.

Following cleaning and pretreatment of the base metal 10, a first intermediate layer 5 (FIG. 3) comprising a nickel "flash" or "strike" is applied to the base metal 10. First intermediate layer 5 comprises a single phase metal of nickel. A nickel intermediate layer 5 on the base metal surface 15 enhances adhesion of a second intermediate layer 20 necessary for adhesion of first coating layer 25. The nickel intermediate layer 5 is generally applied by standard electroplating techniques. The term "nickel flash" or "nickel strike" refers to a thin nickel coating. The first intermediate layer 5 will have a thickness of, in one embodiment, from about 5 microns to about 50 microns, and in one embodiment from about 10 microns to about 20 microns.

A second intermediate layer 20 is applied to first intermediate layer 5. Second intermediate layer 20 overlies first layer 5. Second layer 20 comprises a strike of a single phase metal of silver which enhances adhesion of first coating layer 25. Second intermediate layer is applied in a similar manner as first intermediate layer 5. The second intermediate layer 20 will have a thickness, in one embodiment, from about 5 microns to about 50 microns, and in one embodiment from about 10 microns to about 20 microns.

A first coating layer 25 of silver is then applied to the second intermediate layer 20. In one embodiment, first coating layer 25 is applied by electrodeposition from a silver cyanide plating solution in a manner as is known to those skilled in the art. It is contemplated, however, that other methods of application of the first coating layer 25 are possible. Such methods may include, but are not limited to, chemical vapor deposition, plasma spraying, and electroless plating.

Regardless of the method of application of the first coating layer 25, the coating is applied to provide a coating thickness of, in one embodiment, at least about 0.5 mils. Coating thicknesses of about 5.0 mils to about 6.0 mils and higher are contemplated. However, the coating thickness is dependent on the application for which it is intended.

A second coating layer 30 is applied overlying first coating layer 25. The second coating layer 30 comprises indium. The second coating layer 30 may be applied in a manner similar to application of the first coating layer 25, e.g., by electroplating. As seen in FIG. 1, the second coating layer 25 is applied to the first layer 25 at a substantially lesser thickness. Typically, the second coating layer 30 will have a thickness on the order of, in one embodiment, from about 50 microns to about 100 microns, and in one embodiment, about 60 microns to 80 microns.

The precise chemical solutions of the first and second intermediate layers 5, 20 and first and second coating layers 25, 30 are not critical to the present invention. Thus, it will be apparent to those skilled in the art from this disclosure that any suitable electrolytic/chemical solution may be used for electroplating of the layers 5, 20, 25, 30.

Following application of the first 25 and second 30 coating layers, the substrate 10 with applied coatings 5, 25, 30 will proceed through a baking step. Baking of the first 25 and second 30 coating layers can be executed by placing the coated metal base 10 into equipment which is designed to provide the layers 25, 30 with sufficient time to diffuse the second coating layer 30 of indium into the first coating layer 25. Baking may be executed at or near atmospheric pressure, in one embodiment, in air, and in one embodiment, may be in an inert atmosphere such as nitrogen or argon. The length of exposure necessary to diffuse the layers 25, 30 varies with such factors as the temperature and the thickness of the layers 25, 30. Generally, the exposure is quite brief and baking is completed in less than about 1 hour. The actual exposure time and temperature required to give proper diffusion of the coating layers can be readily determined by one skilled in the art with a minimum of experimentation. Oven temperatures will range from about 325° F. to about 350° F., in one embodiment, and in one embodiment at about 330° F.

Figure 2:
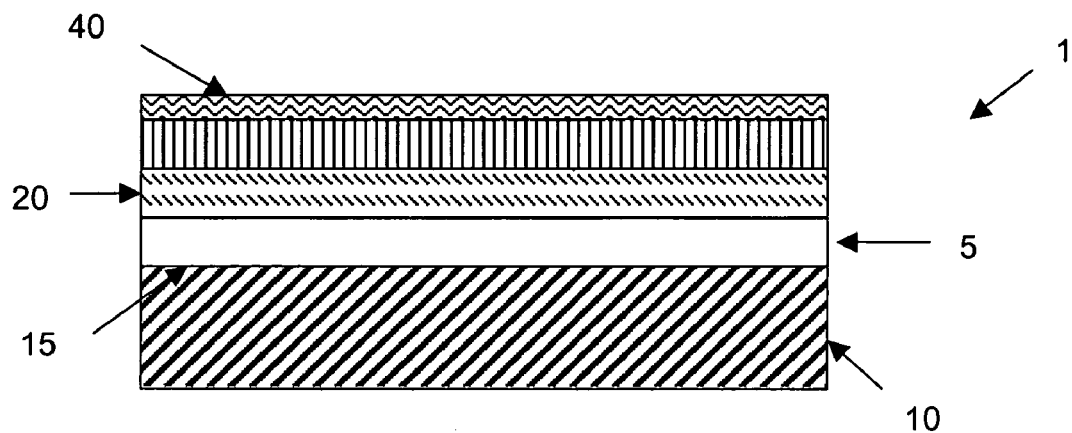
FIG. 2 is a schematic cross-sectional view of an embodiment of the invention following creation of the alloy layer in accordance with an embodiment of the present invention.

During the heating of the base metal 10 with applied coating layers 25, 30, a heat created alloy layer 40 is formed as shown in FIG. 2. The heat created alloy layer 40 includes elements of the first coating layer 25 molecularly intertwined with elements of the second coating layer 30. The migration of the second indium coating layer 30 into the first silver coating layer 25 results in the formation of heat created silver-indium alloy layer 40. The heat created alloy layer 40 functions as a corrosion-resistant layer. Typically, the thickness of the alloy layer is at least about 50-100 microns in one embodiment, and typically about 80 microns; however, thicker alloy layers can be formed. In one embodiment, second coating layer 30 will completely diffuse into first coating layer 25 to form alloy coating layer 40.

Figure 4:
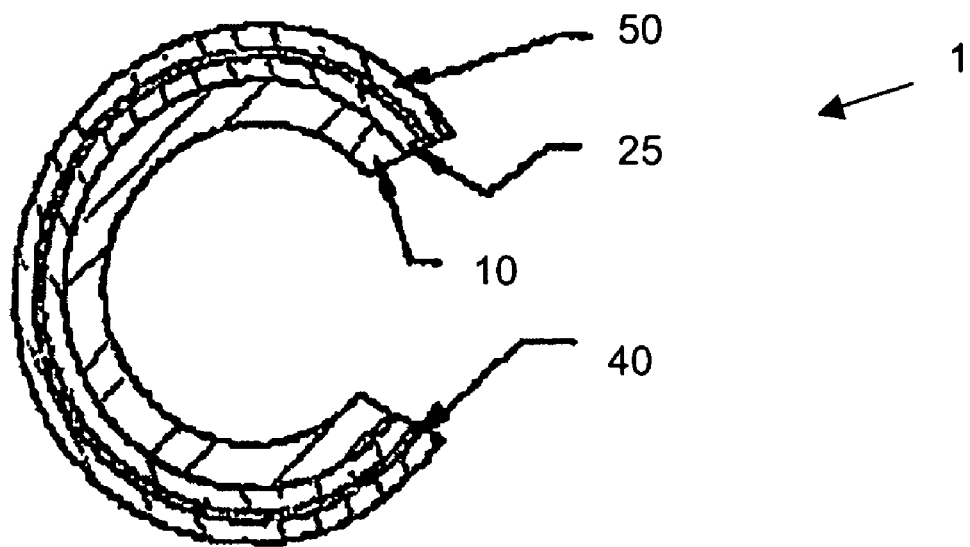
FIG. 4 is a cross-sectional view of a C-ring seal in accordance with an embodiment of the invention.
Figure 5:
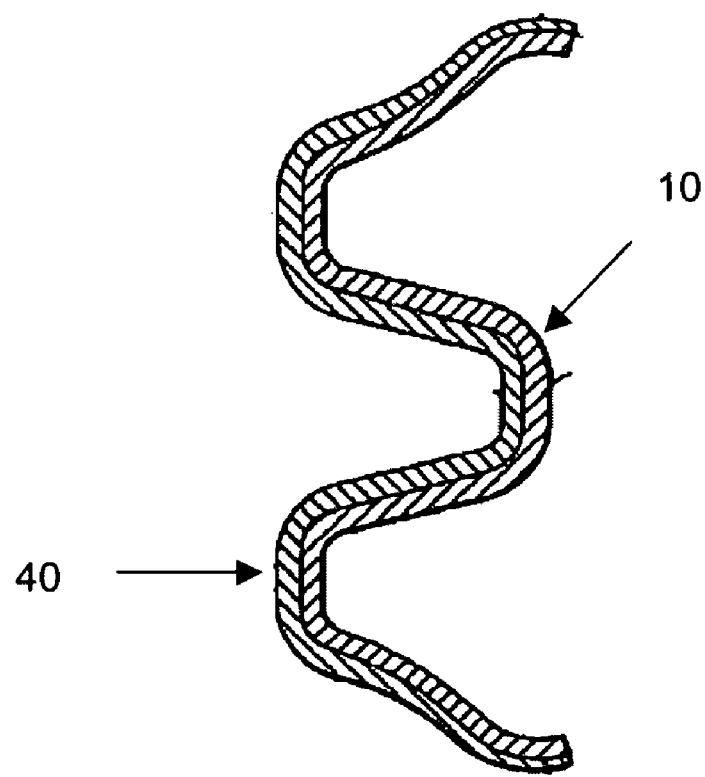
FIG. 5 is a cross-sectional view of an E-ring seal in accordance with an embodiment of the invention.

In one embodiment, an optional protective coating layer 50 may be applied to the alloy coating layer 40. Referring to FIG. 4, there is shown a cross-sectional view of a C-ring seal according to the invention. In one embodiment, the protective coating layer 50 will typically be formed from a silver electroplate and applied as described above with reference to the first and second coating layers 25, 30. As shown in FIG. 4, the entire exterior surface of the alloy coating layer 40 is covered by protective coating 50. The protective coating layer 50 is effective to protect the underlying alloy coating layer 40 from damage occurring during handling or installation of the seal. In one embodiment, the protective coating layer 50 will be applied at a thickness of from about 0.5 mil to about 1.0 mil and in one embodiment from about 0.25 mil to about 1.25 mil. Where a protective coating layer 50 is utilized, it will be understood that baking of the coating layers 25, 30 will follow application of the protective coating layer 50.

The process of the invention is particularly serviceable for seals and sealing systems which have utility in high temperature (up to 1750° F.) and high pressure applications where highly effective seal elements are required, such as in connection with aircraft, automotive and aerospace industries, and industries associated with power generation, such as the oil and gas industries.

EXAMPLE 1

Three sets of E-configuration and C-ring configuration seals having a base metal of Inconel 718 were plated in accordance with the following Table 1:

TABLE 1

| Configuration | Nickel | Silver | Gold Strike | Indium |
|---|---|---|---|---|
| E-1, C-1 | | 1.5 mil | 200μ | |
| E-2, C-2 | 1.5 mil | — | — | — |
| E-3, C-3 | | 1.5 mil | | 50μ |

Samples labeled E3 and C3 were prepared in accordance with the present invention. Samples labeled E1-E2 and C1-C2 are considered comparative examples. E1 and C1 were prepared in accordance with AMS 2411. E2 and C2 were prepared in accordance with AMS 2424.

Following coating of the seals, the seals were placed in a bolted test fixture with compression limiting shims. The seals were compressed to 20% of their original free height. The fixture with seal installed was then temperature soaked at 1400° F. for 4 hours. The fixture was pressurized, and any leakage of nitrogen through the seals was detected by a mass flow meter placed up stream of the test fixture between the Nitrogen tank and the test fixture.

Following measurement of seal leakage at 1400° F., the temperature was raised to 1700° F. and the fixture with installed seal was temperature soaked for 4 hours. Leakage was again tested as described above.

Results of the testing are shown in Table 2:

TABLE 2

| Configuration | Temperature ° F. | Leakage |
| --- | --- | --- |
| E-1 | 1400° F. | 124 ml/min |
| E-1 | 1700° F. | 80 ml/min |
| E-2 | 1400° F. | >200 ml/min |
| E-2 | 1700° F. | >200 ml/min |
| E-3 | 1400° F. | <10 ml/min |
| E-3 | 1700° F. | 10 ml/min |
| C-1 | 1400° F. | <10 ml/min |
| C-1 | 1700° F. | <10 ml/min |
| C-2 | 1400° F. | 50 ml/min |
| C-2 | 1700° F. | |
| C-3 | 1400° F. | <10 ml/min |
| C-3 | 1700° F. | <10 ml/min |

It is, therefore, evident from the results that seals prepared according to the invention operate as well as or better than the comparison examples at high temperatures.

While the invention has been explained in relation to its preferred embodiments, it is to be understood that various modifications thereof will become apparent to those skilled in the art upon reading the specification. Therefore it is to be understood that the invention disclosed herein is intended to cover such modifications.

We claim:

1. A process for coating of a metallic seal comprising:
    applying a first intermediate layer to a base metal;
    applying a second intermediate layer overlying the first intermediate layer;
    applying a first coating layer comprising silver overlying the second intermediate layer;
    applying a second coating layer comprising indium overlying the second coating layer;
    baking the base metal with applied intermediate and coating layers at a temperature to diffuse first and second coating layers to form a silver indium alloy coating layer having of thickness within the range of 50 to 100 μm, wherein the coated metallic seal is operable at a temperature of 1400° F. (760° C.) and at temperatures up to 1750° F. (954° C.), and is capable of being deformed.

2. The process of claim 1 wherein the first intermediate layer comprises a nickel strike.

3. The process of claim 1 wherein the second intermediate layer comprises a silver strike.

4. The process of claim 1, wherein the first and second coating layers are applied by electroplating.

5. The process of claim 1, wherein the base metal is one or more of a low carbon steel, a low alloy steel, a stainless steel, a nickel-based corrosion-resistant alloy, a cobalt-based alloy, a copper, a copper alloy, and INCO.

6. The process of claim 1, further comprising applying a protective coating layer to the alloy coating layer.

7. The process of claim 6, wherein the protective coating layer comprises silver.

8. A metallic seal coating manufactured by the process of claim 1.

* * * * *